Figure 1:
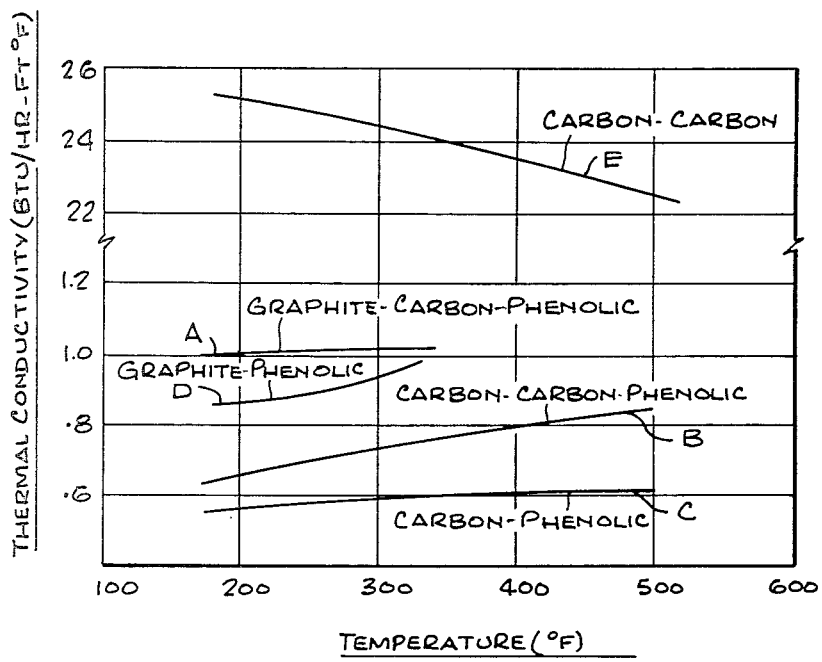

United States Patent [19]

Seibold et al.

[11] 4,215,161
[45] Jul. 29, 1980

[54] FIBER-RESIN-CARBON COMPOSITES AND METHOD OF FABRICATION

[75] Inventors: Robert W. Seibold, Santa Monica; Haig S. Parechanian, Fountain Valley; William T. Weatherill, La Palma; Robert E. Lowe, Santa Ana, all of Calif.

[73] Assignee: McDonnell Douglas Corporation, Long Beach, Calif.

[21] Appl. No.: 890,647

[22] Filed: Mar. 20, 1978

Related U.S. Application Data

[62] Division of Ser. No. 531,662, Dec. 11, 1974, Pat. No. 4,100,322.

[51] Int. Cl.$^2$ .......................... B32B 7/00; B05D 3/02; B05D 3/12
[52] U.S. Cl. .................................... 427/228; 264/29.5; 427/350; 427/385.5; 427/386; 427/393.6; 427/387; 427/389.8; 427/407.1; 427/407.3
[58] Field of Search .................. 427/228, 350, 385 R, 427/385 C, 386, 387, 390 A, 407 B, 407 R; 264/29.5; 428/257, 271, 273, 366, 408, 902

[56] References Cited

U.S. PATENT DOCUMENTS

| | | | |
|---|---|---|---|
| 3,462,289 | 8/1969 | Rohl et al. | 428/408 X |
| 3,772,115 | 11/1973 | Carlson et al. | 264/29.5 X |

Primary Examiner—Michael R. Lusignan
Attorney, Agent, or Firm—Max Geldin

[57] ABSTRACT

Production of composites having increased strength, particularly at elevated temperature, heat resistance and ablative properties, while maintaining low weight, by a process which comprises impregnating fibrous reinforcement, such as a woven fabric of graphite yarns, with a resin, e.g., a phenolic resin, curing the resin to yield a fiber-resin composite, pyrolyzing such composite to convert the resin to a porous carbonaceous matrix, reimpregnating the porous fiber-carbon composite with additional resin, such as a phenolic resin, to fill the pores of the matrix, and curing the reimpregnating resin. The resulting fiber reinforcement-resin matrix-carbon matrix (i.e., bimatrix) composites are particularly useful and valuable as reinforced plastic aerospace components requiring strength at high temperatures and having improved ablative properties.

22 Claims, 6 Drawing Figures

FIBER-RESIN-CARBON COMPOSITES AND METHOD OF FABRICATION

This is a division of application Ser. No. 531,662, filed Dec. 11, 1974 now U.S. Pat. No. 4,100,322.

BACKGROUND OF THE INVENTION

Plastic composites are widely used for aerospace applications where high strength, low weight, good heat resistance and ablative properties are required. Examples of these applications include rocket nozzle liners, rocket motor case liners, and reentry vehicle heat shields, nose tips and leading edges. The plastic composites generally consist of a fibrous reinforcement such as graphite or quartz fabric and a resin matrix such as phenolic or polyimide. A problem associated with use of these composites is that the upper temperature at which they can be used is generally limited by the heat resistance of the resin. For example, the compression strength of a composite of three-dimensionally woven graphite fabric impregnated with phenolic resin may be 40,000 psi at room temperature but only 2,000 psi at 700° F. This loss of strength is primarily due to degradation of the phenolic resin, not of the graphite fabric. Decrease in strength of graphite fabric alone at 700° F. is insignificant. Another composite property that can be limited by the resin is ablation resistance. This limitation is frequently associated with the limited heat resistance of the resin.

Several approaches for alleviating or circumventing this problem have been attempted in the past. One approach was to develop resins with increased heat resistance. Although many new resins such as polybenzimidazoles, polyquinoxalines and pyrrones have been made available, they are generally very difficult to process, and their heat resistance is still considerably less than that of many reinforcement materials. Another approach was to increase the reinforcement content of composites thereby decreasing the resin content by adding particulate or fibrous fillers such as carbon or silica during processing. This method has had only limited success because the fillers are not mechanically locked or adhered to the basic reinforcement and therefore contribute little to the strength or ablative properties of the composite. A third approach was the development of composites in which both constituents, i.e., the reinforcement and the matrix, were high temperature ceramic materials. Examples are carbon-carbon and quartz-silica composites. These materials have excellent heat resistance and ablative properties but are generally too brittle or too thermally conductive for many of the applications mentioned above.

Carbon-carbon and carbon-phenolic materials are examples of fiber reinforced composites that have been highly developed by the aerospace community for use as thermal protection systems and have generally been shown to be the lightest in weight for high ballistic coefficient reentry vehicles. Important attributes of carbon-carbon composites include low ablative recession, smooth ablative surfaces, and high strength at elevated temperatures. However, application of these attributes presents severe design problems because carbon-carbon materials have (1) very high thermal conductivity which results in high internal temperatures, (2) low tensile strain to failure which can result in thermal stress-cracking problems from reentry heating, and (3) low structural response resistance to impulsive loads. On the other hand, carbon-phenolic materials have significantly lower thermal conductivity, moderate tensile strain to failure, and low thermal expansion. These characteristics simplify design by yeilding low internal temperatures and minimizing the thermal stress problem; but this is done at the expense of increased ablation and loss of strength above 600° F.

U.S. Pat. No. 3,778,336 to Adams discloses a method for preparing light-weight carbonized structures by coating, for example, a polyurethane foam with a resin layer, subjecting the resulting coated structure to pyrolysis, and then coating the pyrolyzed structure with an oxidation-resistant organic resin. This patent is directed to a surface coating method and does not involve fabrication of a fiber reinforced material according to the present invention concept.

U.S. Pat. No. 3,796,616 to Northway discloses a method for production of fibrous graphite structures by incorporating fugitive or degradable fibrous material between plies of resin impregnated cloth, curing the resin and thereafter disintegrating the fibrous material, leaving a porous substrate which is subsequently infiltrated with pyrolytic carbon. This procedure does not produce a mixed carbon and resin matrix, that is a bimatrix material, in accordance with the present invention.

This invention relates to the production of plastic composites formed of fiber and resin, having improved strength at high temperatures, and improved heat resistance, while maintaining low weight, and is particularly concerned with the production of composites of the above type composed of a mixture of pyrolyzed and non-pyrolyzed resin, e.g., phenolic, matrices reinforced with carbon or graphite yarns, preferably in the form of a woven fabric, and forming a bimatrix composite; and the procedure for producing such composites.

DESCRIPTION OF THE INVENTION

The present invention provides a method for adding carbon matrix to conventional fiber-resin composites, and thereby decreasing the resin content, utilizing a concept which provides mechanical locking and adherence of the carbon matrix to the fiber reinforcement. Thus, the invention provides a process for fabricating a novel form of non-metallic material in the nature of a fiber-resin-carbon composite. The novel composite structure of the invention contains the two conventional constituents of fiber-resin composites, namely a fibrous reinforcement and a resin matrix, but in addition includes a third component, namely carbon, formed in situ. As will be noted hereinafter, the third consituent of the invention composite, namely the carbon formed in situ, functions as an additional matrix component, so that the resulting composite is comprised of three constituents, namely the fibrous reinforcement, the resin matrix and the carbon matrix, and hence is described herein as a "bimatrix" composite.

Fibrous reinforcement-carbon-resin, particularly phenolic, bimatrix compositions have been developed according to the present invention which provide a balance of the desirable properties of the above noted carbon-carbon and carbon-resin, particularly phenolic, composites, and have provided significantly improved thermal protection materials. Such materials preferably consist of multidirectionally woven carbon or graphite reinforcements embedded in a mixture of carbonaceous and resinous, e.g., phenolic, matrices. These composites have been shown to have low ablative recession and to maintain strength at elevated temperature, approaching performance of carbon-carbon composites, while exhibiting the low thermal conductivity approaching the values for carbon-phenolic composites. An additional advantage of the bimatrix composites of the invention as compared with carbon-carbon materials lies in greatly simplified fabrication and lower costs for producing the bimatrix composites of the invention. Also, the processing procedure used according to the present invention permits a large range of variations in properties so that the mechanical and thermal properties can be tailored for specific applications. Thus, variations in the process according to the present invention can yield bimatrix composites with varied types and proportions of the three constituents, that is, the fibrous reinforcement, the carbon matrix and the resin matrix. Thus, bimatrix composites of the invention provide improved thermal protection materials for reentry vehicle heat shields, leading edges, control surfaces, and rocket nozzle liners.

Briefly, the bimatrix or fiber-resin-carbon composites of the invention are produced by a process which comprises impregnating fibrous reinforcement with resin, pyrolyzing the composite to convert the resin to a porous carbonaceous matrix and reimpregnating the resulting porous fiber-carbon composite with additional resin to fill the pores of the composite created during pyrolysis. Generally, thermosetting resins are employed, and the initial impregnating resin is cured prior to pyrolysis, and the reimpregnating resin is cured following reimpregnation of the pyrolyzed composite.

The resulting fiber-resin-carbon composite contains less resin than the conventional fiber-resin composite employed as precursor, since the in situ carbon occupies space normally occupied by the resin. Unlike carbon added as a powder of fiber filler, the carbon formed in situ by pyrolysis according to the invention serves as an excellent additional reinforcement because it is mechanically locked and adhered to the original fibrous reinforcement. This additional reinforcement serves to increase the elevated temperature strength and ablative properties of the composite. However, the composite still contains sufficient resin resulting from reimpregnation, to remain tough and thermally insulative.

The process of the present invention can be employed to provide bimatrix composites formed of various fibrous reinforcement materials and various plastics. Thus, typical fibrous reinforcements which can be employed in the invention composites are, for example, carbon, graphite, glass, silica, quartz, asbestos and boron fibers. Typical resins which can be employed for producing the resin composites of the invention include phenolic, coal tar pitch, polyphenylene, hetrocyclic resins, epoxy, silicone, melamine, alkyd, polyester and polyimide resins. Examples of phenolic resins which can be employed include phenolformaldehyde, phenolacetaldehyde, phenol-furfural, m-cresolformaldehyde and resorcinol-formaldehyde resins. Epoxy resins which can be utilized include the diglycidyl ether of bisphenol A, diglycidyl ether of tetrachloro-bisphenol A, diglycidyl ether of resorcinol, diglycidyl ester of dimeric linoleic acid, triglycidyl ether of glycerol, polyglycidyl ethers of glycol, diglycerol, mannitol, and the like, and epoxy novolacs. Preferred epoxies comprise the glycidyl ethers such as the glycidyl ethers of the phenols, and particularly those prepared by reacting a dihydric phenol with epichlorhydrin, e.g., the diglycidyl ether of bisphenol A, and epoxy novolacs. The silicone polymers or resins which can be employed include methyl siloxane polymers and mixed methyl phenyl siloxane polymers, e.g., polymers of dimethyl siloxane, polymers of phenylmethylsiloxane, copolymers of phenylmethylsiloxane and dimethylsiloxane, and copolymers of diphenylsiloxane and dimethylsiloxane. Examples of melamine resins are melamine-formaldehyde. Examples of hetrocyclic resins are polybenzimidazoles, polyquinoxalines and pyrrones. Any of the well-known specific alkyd, polyester and polyimide resins can be employed. The phenolics are preferred.

One type of resin can be employed in forming the initial fiber-resin composite, followed by pyrolysis thereof, and another type of resin can be employed for reimpregnating the pyrolyzed porous fiber-carbon composite. Preferred resins for production of bimatrix composites, particularly effective as high-strength materials at elevated temperatures and having improved ablative properties, for use in production of aerospace components, are the phenolic resins, such as phenol-formaldehyde and phenol-furfural resins. Preferred fibrous reinforcement materials are carbon or graphite yarns, particularly the three-dimensional woven fabrics formed of such yarns.

In carrying out the invention process, the fibrous reinforcement, e.g., a three-dimensional woven fabric of carbon or graphite yarns, is impregnated with a resin, e.g., a phenolic resin such as a solution of SC-1008 phenolic resin marketed by Monsanto Chemical Company, in isopropyl alcohol, by an impregnation and simultaneous solvent stripping procedure at elevated temperature and under vacuum. Thus, the fabric reinforcement is treated with the solution of the phenolic resin under vacuum and at elevated temperature, e.g., of the order of about 150° F., under conditions and for a period so as to boil out the solvent and assure substantially complete impregnation of the resin into the fabric. This procedure can be carried out over an extended period using conventional techniques, until substantially all of the solvent has been removed and the resin commences to gel. At this point the resin impregnated fiber composite can contain typically from about 35 to about 45% fiber and about 55 to about 65% resin, by weight.

The resulting fiber-resin composite is then cured at temperatures ranging from about 275° F. to about 450° F., depending upon the particular resin used, the above noted SC-1008 phenolformaldehyde resin being preferably cured by heating slowly to about 350° F. over an extended period and maintaining the temperature at such level over an additional period of time.

The fiber or fabric reinforcement impregnated with the cured resin is then subjected to pyrolysis. Pyrolysis temperatures can range from about 1,000° F. to about 2,500° F. and preferably from about 1,300° F. to about 1,900° F., the optimum temperature range for pyrolysis of phenolic resin contained in such composite ranging from about 1,800° F. to about 1,900° F. Pyrolysis is carried out in an inert atmosphere, e.g., of nitrogen, argon, helium or a vacuum, in a suitable pyrolysis furnace. Usually, such pyrolysis is carried out by gradually raising the temperature to the maximum desired temperature within the above noted temperature ranges, e.g., about 1,800° F., and the temperature is held at such maximum for a short period ranging from a few seconds up to an hour. Generally, maximum pyrolysis temperature in the upper portion of the above ranges, e.g., of the order of 1,800° F., provides a dense carbon affording good ablation resistance, good temperature stability and moderate thermal conductivity. On the other hand, pyrolysis temperatures in the lower portion of the above noted ranges, e.g., of the order of about 1,300° F., results in formation of low density carbon and a composite having somewhat decreased ablation performance as compared to pyrolysis, e.g., at about 1,800° F., and decreased thermal conductivity and decreased strength at elevated temperature as compared to the composite produced at temperature of the order of about 1,800° F. Thus, ablation performance is considered to be in large measure a function of the pyrolysis temperature, operation in the upper portion of the above ranges, e.g., of the order of about 1,800° F., providing good ablation resistance.

During pyrolysis a portion of the resin is converted to gas, which escapes, and the remainder of the resin is converted to carbon, which remains in the composite. The weight loss of the composite during pyrolysis can range from about 10 to about 30%, e.g., about 20%, corresponding to production of a porous composite which can have about a 20 to about 40% porosity by volume based on the entire composite. During the pyrolysis, the carbon or graphite fibers of the fibrous reinforcement are not affected because they are already in carbonaceous form.

The resulting fiber-porous carbon char composite is then reimpregnated with resin. The pyrolyzed fiber-carbon composite, following pyrolysis, thus is subjected to treatment with a suitable resin for reimpregnating the pores of such composite. For this purpose any of the above noted resins can be employed. Desirable properties of a reimpregnant for producing bimatrix composites according to the invention, includes good ablative performance and strength combined with good processability. The latter property is primarily related to the ability of the reimpregnating resin to penetrate a pourous carbonized composite. It has been found that phenolic resins, and particularly the phenolic resin marked by Ironsides Resins, Inc. as FF17 castable phenolic resin, has an unusual combination of the above desirable characteristics. The latter resin is understood to be modified phenolic resin in the form of a phenol-formaldhyde resin containing a primary aromatic amine, such modified resin containing no solvent. Such resin system from experience has been found to penetrate porous carbon composites particularly effectively.

The pyrolyzed fiber-carbon composite generally is placed in a container such as an impregnation tray and the resin is introduced into the container to fully submerge and infiltrate the composite. For effective and thorough penetration of the pores of the composite by the impregnating resin, in preferred practice the resin is introduced under vacuum, e.g. of about 29 inches mercury, and also at elevated temperature to reduce the viscosity of the resin, e.g., about 150° F. The vacuum can be released and reapplied several times to aid penetration of the composite by the resin. The assembly can then be pressurized at elevated temperature, e.g., in an autoclave at elevated temperature say to the order of about 150° F. to further assure thorough impregnation of the resin into the pores of the composite. This same procedure can be employed for impregnating the fiber or fabric reinforcement with resin initially to assure complete impregnation.

The resin reimpregnated fiber-carbon composite is then subjected to elevated temperature for curing the reimpregnated, e.g., phenolic, resin. For this purpose, curing temperatures can be employed generally in the same range as for curing the resin when producing the initial fiber-resin composite prior to pyrolysis. Thus, curing temperatures in this step can range from about 275° F. to about 450° F., particularly for curing phenolic resin. It will be understood that curing temperatures above or below the aforementioned range can be employed as desired, for different types of resins. During the curing of the reimpregnating resin, heating in an oven is generally carried out gradually up to the maximum curing temperature, e.g., about 350° F., following which the composite can be maintained at such maximum temperature for an additional period of time to complete the curing of the resin. Following curing, excess resin is mechanically removed from the surface of the composite.

The resulting fiber-carbon-resin composites are bimatrix composites containing three components, namely fiber such as graphite or carbon yarn reinforcement, carbon from the pyrolysis of the initial resin impregnant, e.g., phenolic, and non-pyrolyzed, e.g., phenolic, reimpregnating resin. These composites thus have a dual matrix, namely the carbon produced by pyrolysis which is mechanically locked within the original yarn reinforcement, and the resin introduced upon reimpregnation of the fiber-porous carbon composite. The resulting bimatrix composite generally particularly exhibits improved elevated temperature properties and ablation characteristics and good dimensional stability. The bimatrix composites of the invention in effect are hybrids with relation to the properties of the prior art fiber-carbon composites and the fiber-resin composites. Thus, for example, the carbon fiber-carbon-phenolic resin bimatrix composites of the invention have the low thermal conductivity and low thermal expansion characteristics of the carbon fiber-phenolic composites, while at the same time having the high strength at elevated temperatures, and low ablative recession of carbon fiber-carbon composites.

The improved bimatrix composites of the invention generally contain about 35 to about 60%, usually about 35 to about 50%, of reinforcement fibers, about 20 to about 45%, usually about 25 to about 40%, resin, and about 20 to about 45%, usually about 25 to about 40%, carbon, by weight.

The following are examples of practice of the invention.

Figure 4:
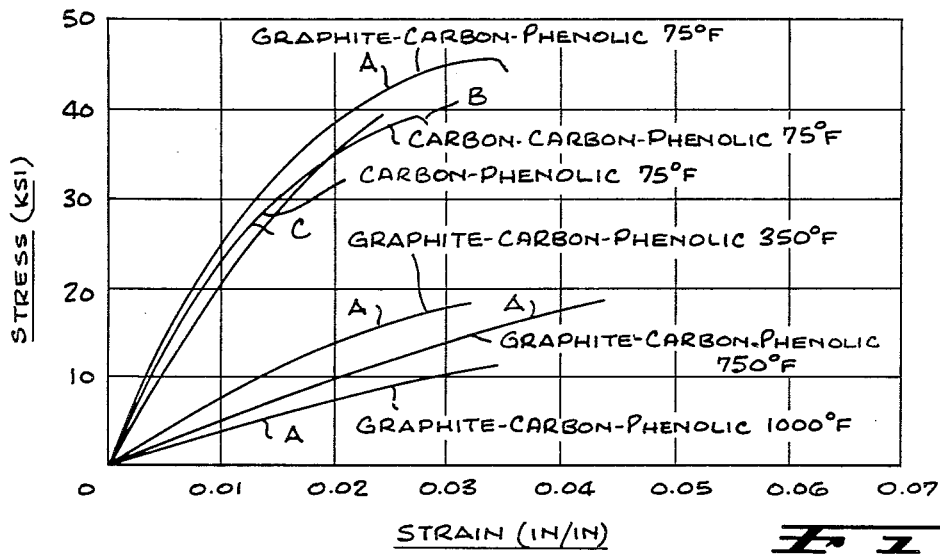
Figure 5:
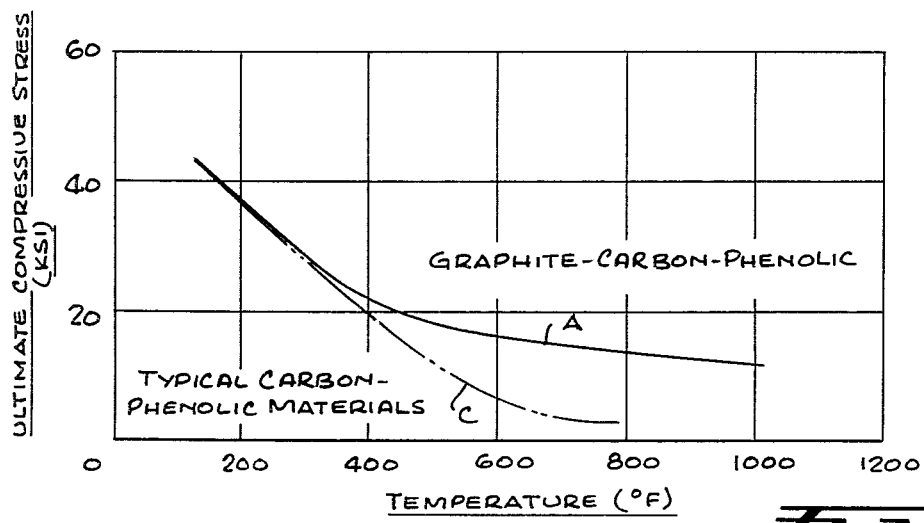
Figure 6:
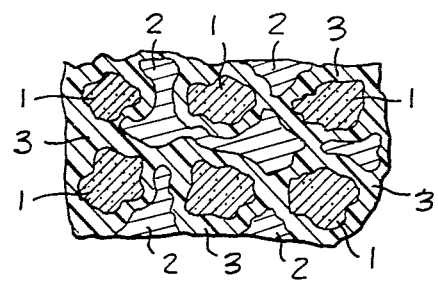

Example 1 below is described particularly in connection with the accompanying drawing wherein:

FIGS. 1 to 5 are plots comparing various properties of the invention composites with conventional composites, and FIG. 6 illustrates the structure of the graphite-carbon-phenolic bimatrix composite of the invention, produced in Example 1.

EXAMPLE 1

A pair of three-dimensionally (3-D) reinforced composites were fabricated with a mixed two-phase matrix, pyrolyzed phenolic resin plus cured phenolic resin, and an additional 3-D reinforced composite with a simple one-phase matrix (cured phenolic resin) was also fabricated to provide a standard carbon-phenolic material for comparison.

All three composites were fabricated from three-dimensional fabric preforms which were loom woven in coarse orthoganol patterns. One of the fabric preforms used for production of one of the bimatrix composites of the invention, designated A, was woven from GX graphite yarns, and the other preform used for producing the second bimatrix composite according to the invention, designated B, was woven from CX carbon yarns. The fabric preform used for production of the reinforced composite having a one-phase matrix, the conventional composite designated C, was also woven from CX carbon yarns.

The properties of the GX graphite and CX carbon yarns employed in producing the woven 3-D preforms noted above are listed in Table 1 below.

Table 1

| Property | Yarn | Yarn |
|---|---|---|
| Type | GX graphite | CX carbon |
| Filament diameter (microns) | 8–10 | 8–10 |
| Tensile strength (psi × $10^3$) | 120–180 | 120–180 |
| Modulus of elasticity (psi × $10^6$) | 6–8 | 6–8 |
| Density (g/cc) | 1.5 | 1.45 |
| Carbon assay | 99.9 | 90–95 |
| Filaments/ply | 720 | 720 |
| Breaking strength of 30-ply yarn (lb.) | 35 | 35 |

The three fabric preforms were impregnated with Resinox SC-1008 phenolic resin containing isopropanol solvent, and having 60 to 80% solids content. A single-step impregnation and solvent stripping procedure was employed. The preforms were first placed in an impregnation tray and the resin was introduced at 150° F. under vacuum, submerging the preforms. The isopropanol solvent was gradually boiled away by maintaining a controlled vacuum at 150° F. until the resin gelled. The solvent stripping process was interrupted twice and on each such occasion the assembly was pressurized to 200 psig in an autoclave at 150° F. in order to ensure thorough penetration of the fabric preforms by the resin. A rubber bladder was clamped over the exposed resin surface during autoclave pressurization. Upon gelation, excess resin was scraped from the fabric preforms. The ratio of resin to alcohol in the resulting impregnated preforms was about 95 to 5 by weight.

The three resin impregnated preforms were cured in an autoclave under 200 psig pressure at about 325° F. for about 3 hours. The cured composites were then post-cured to 350° F. in flowing nitrogen to further polymerize the SC-1008 resin, relieve stresses, provide dimensional stability and improved temperature properties. The resulting cured fiber-phenolic resin composites contain about 35 to 45% fiber and about 55 to 65% phenolic resin.

At this point, two of the three fiber-phenolic resin composites were subjected to pyrolysis, one containing the graphite fibers and the other containing carbon fibers. One of such composites, the graphite fiber-phenolic resin composite, resulting in the bimatrix composite A of the invention, was pyrolyzed at maximum temperature of 1,827° F., and the other carbon fiber-phenolic resin composite, resulting in the bimatrix composite B of the invention, was pyrolyzed at a lower maximum pyrolysis temperature of 1,350° F. Pyrolysis was carried out in an inert nitrogen atmosphere within a furnace, in each case initially carrying out a slow heat-up cycle of about 40 hours to the maximum pyrolysis temperature, followed by holding at such high temperature for a short period of about 10 minutes. The weight loss of the composites during pyrolysis was about 22% corresponding to carbon yields of the phenolic resin in the composites of 54 to 55%, based on weights before post-cure.

The third carbon fiber-phenolic resin composite not subjected to pyrolysis served as the conventional composite C.

Following cooling, the two pyrolyzed fiber-carbon composites were then reimpregnated with phenolic resin. The resin employed for reimpregnation was FF17 castable phenolic resin, and the reimpregnation was carried out by placing the composites in an impregnation tray and introducing the resin at 150° F. under vacuum, submerging the composites. The vacuum was released and reapplied several times in succession to facilitate penetration of the pores of the composites by the resin. The composites were then pressurized to 200 psig in an autoclave at 150° F. to further assure thorough impregnation, and were oven heated at 150° F. for 16 hours to gel the resin. A rubber bladder was claimped over the exposed resin surface during autoclave pressurization.

The non-pyrolyzed third carbon-phenolic composite C was similarly reimpregnated to increase the phenolic matrix content thereof.

The cure of the reimpregnated resin was effected for all three composites in an oven by heating gradually from room temperature to 350° F. in about 12 hours, and maintaining the temperature at 350° F. for an additional 12 hours, followed by cooling to room temperature in about 12 hours. Excess resin was mechanically removed from the surface of the composites.

The characterization results for the three composites are noted in Table 2 below.

Table 2

| | CHARACTERIZATION OF COMPOSITES | | |
|---|---|---|---|
| | A | B | C |
| | Graphite-Carbon-Phenolic Composite | Carbon-Carbon-Phenolic Composite | Carbon-Phenolic Composite |
| Property | | | |
| Carbon matrix pyrolysis temperature (°F.) | 1,827 | 1,350 | — |
| Bulk density (g/cc) | 1.36 | 1.34 | 1.32 |
| Composition (weight %) | | | |
| Graphite or carbon fabric | 39 | 42.4 | 42.3 |
| Phenolic resin | 33 | 29.3 | 57.7 |
| Carbon from pyrolyzed phenolic resin | 28 | 28.3 | — |
| Total | 100 | 100.0 | 100.0 |
| Composition (volume %) | | | |
| Graphite or carbon fabric | 36 | 39.1 | 38.3 |
| Phenolic resin | 35 | 30.4 | 60.0 |
| Carbon from pyrolyzed phenolic resin | 25 | 24.7 | — |
| Porosity | 4 | 5.8 | 1.7 |

Table 2-continued

| Property | A Graphite-Carbon-Phenolic Composite | B Carbon-Carbon-Phenolic Composite | C Carbon-Phenolic Composite |
|---|---|---|---|
| CHARACTERIZATION OF COMPOSITES | | | |
| Total | 100 | 100.0 | 100.0 |
| Ratio of carbon matrix to phenolic matrix | | | |
| Weight ratio | 0.85 | 0.97 | 0 |
| Volume ratio | 0.71 | 0.81 | 0 |

The thermal conductivity of the three composites A, B and C which were fabricated, was measured in the radial direction over a temperature range of 175° to 500° F. with a 50° F. temperature differential cross the test specimen. The measurements were performed using a steady-state comparative technique similar to ASTM-C-408, and the results are shown in FIG. 1 of the drawing. Conductivities of a conventional three-dimensional woven graphitephenolic composite, designated D, similar to the carbon-phenolic composite C prepared above, but employing GX graphite fibers instead of carbon fibers, and another conventional three-dimensional woven carbon-carbon composite, designated E, and prepared by the same procedure for producing the carbon-phenolic composite C described above, but wherein the composite is pyrolyzed as described above without resin reimpregnation, were also determined and are shown in FIG. 1 for comparison.

The data shown by the plot in FIG. 1 indicate in general that the bimatrix composites A and B of the invention each had somewhat higher thermal conductivity than the corresponding conventional phenolic matrix composites D and C, respectively, containing the same respective graphite and carbon reinforcements, but were significantly less conductive than the carbon-carbon composite E.

Figure 2:
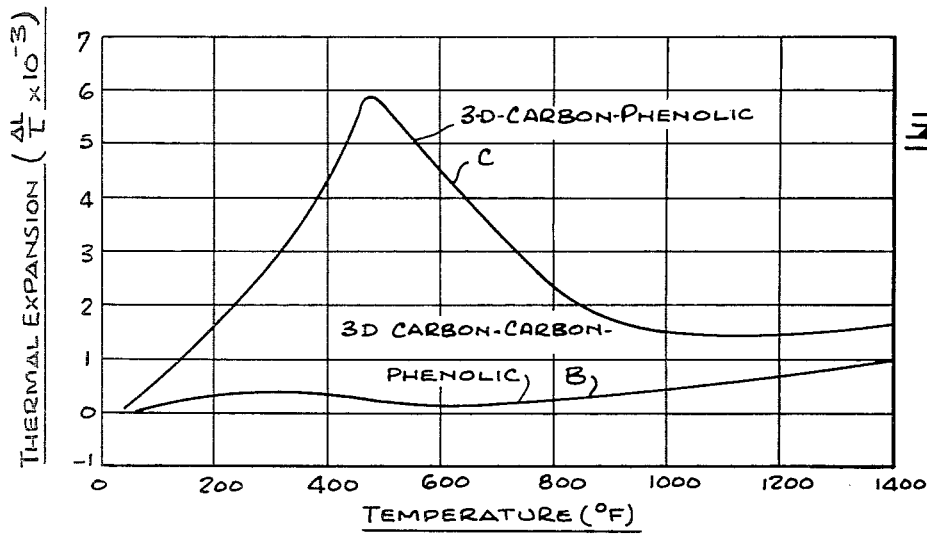

Linear thermal expansion was determined using quartz dilatometry. The temperature range of evaluations was from 75° F. to 1,400° F. FIG. 2 of the drawing compares the thermal expansion of the three-dimensional woven carbon-phenolic composite C with the carbon-carbon-phenolic bimatrix composition B of the invention. The carbon-phenolic composite C exhibited a peak in thermal expansion at approximately 475° F. which was not seen in the bimatrix composite B.

Figure 3:
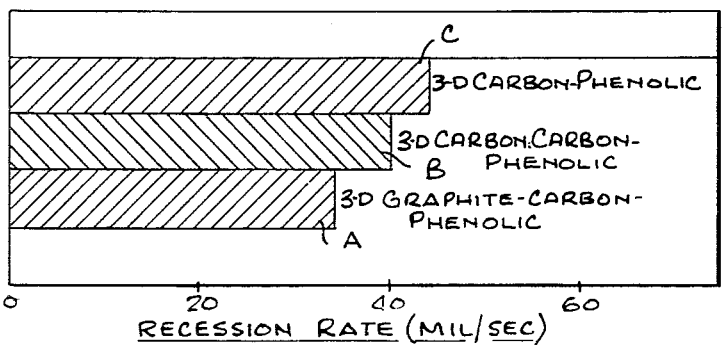

Ablation tests were conducted on the three composites A, B and C, and the results are summarized in FIG. 3 of the drawing. Such ablation tests were carried out on 35° inclined wedge specimens in a plasma jet facility, using the following test conditions: heat flux=3,750 BTU/ft²-sec, bulk enthalpy=3,750 BTU/lb, surface pressure=10.5 atmospheres, and test time=1.25 seconds.

From FIG. 3 it is seen that the ablation performance, as measured by reduction in recession rate, of the bimatrix composites A and B of the invention was superior to that of the carbonphenolic composite C, and that the graphite-carbon-phenolic bimatrix composite A performed better than the carbon-carbon-phenolic bimatrix composite B. It is believed that the latter comparison is related at least in part to the higher pyrolysis temperature employed in fabricating composite A as compared to the pyrolysis temperature used in fabricating composite B.

Compression properties of the graphite-carbon-phenolic bimatrix, composite A, were obtained at temperatures from 75° F. to 1,000° F. Also, compression properties of the carbon-carbon-phenolic composite B, and the carbon-phenolic cmposite C were obtained at 75° F. The elevated temperature tests were performed in argon using a steady-state heating technique with a 15 minute soak period at test temperature. Typical stress-strain curves for the three materials tested are shown in FIG. 4. It can be seen that the strain at failure of composites A and B of the invention compare faborably with carbon fiber-phenolic composite C.

Compression strengths as a function of temperature of composite A of the invention in relation to composite C, the carbon-phenolic matrix, are shown in FIG. 5. From FIG. 5 it can be seen that the compression strength of the graphite-carbon-phenolic bimatrix composite A was significantly better than that of typical carbon-phenolic composites such as C in the 500° F. to 1,000° F. temperature range. Thus, the compression strength of the 3-D carbon-phenolic composite was shown to decrease to 2,000 psi at 700° F. The graphite-carbon-phenolic composite A of the invention, however, has a compression strength of 16,000 psi at 700° F. and over 10,000 psi at 1,000° F., a significant increase.

FIG. 6 illustrates a section of the internal structure of composite A of the invention, numeral 1 indicating graphite yarn filament, numeral 2, carbon matrix and numeral 3, phenolic resin matrix. FIG. 6 shows a thin layer of phenolic matrix or impregnant 3 between the graphite yarns 1 and the carbonized matrix 2, the carbon matrix being mechanically locked within the original graphite yarn reinforcement.

EXAMPLE 2

The procedure for producing composites A and B of the invention set forth in Example 1 is followed, except that in place of employing the castable phenolic resin for initial impregnation, an epoxy novolac resin was employed.

The resulting composite had properties similar to those of composites A and B of Example 1.

EXAMPLE 3

The procedure of Example 1 was followed for producing composites similar to A and B, except that in place of the phenolic resins employed both for initial impregnation and reimpregnation, there was employed an acetylene-based polyphenylene resin.

The resulting composites had properties similar to those of composites A and B.

Thus, it is seen that the bimatrix composites produced according to the invention provide a balance as between the desirable properties of conventional carbon-carbon and carbon-phenolic composites, and can be tailored to provide improved elevated temperature strength, heat resistance and ablative properties.

Use of bimatrix composites according to the invention thus affords the ability to tailor composite properties for optimum performance as heat shields, control surfaces or leading edges for reentry vehicles. The procedure for producing such bimatrix composites permits a large range for variations including the reinforcement construction or fibers, and matrix material types, and ratio of carbon to resin matrices. The fabrication procedure is relatively rapid and simple, involving only two impregnation steps and an intermediate pyrolysis step.

While we have described particular embodiments of the invention for purposes of illustration, it will be understood that various changes and modifications can be made therein within the spirit of the invention, and the invention accordingly is not to be taken as limited except by the scope of the appended claims.

What is claimed is:

1. The process for producing a plastic composite having improved elevated temperature strength and good heat resistance, which consists essentially of impregnating fibrous reinforcement material with a resin, curing said resin, pyrolyzing the resulting fiber-resin composite, reimpregnating the resulting pyrolyzed composite with additional resin and curing said additional resin, said resin reimpregnated composite forming a bimatrix fiber-resin-carbon composite composed of a mixture of pyrolyzed and non-pyrolyzed carbon and resin matrices reinforced with fibrous reinforcement material.

2. The process as defined in claim 1, wherein said pyrolysis is carried out by heating said fiber-resin composite in an oxygen-free atmosphere at a sufficiently high temperature to pyrolyze said resin.

3. The process as defined in claim 2, said impregnating said fibrous reinforcement material with said first mentioned resin and said reimpregnating said pyrolyzed composite being carried out at elevated temperature and under pressure conditions to ensure thorough impregnation of said fibrous reinforcement material and said pyrolyzed composite, respectively, substantially without affecting said fibrous reinforcement material, and said pyrolyzing being carried out in an atmosphere of nitrogen, argon, helium or a vacuum, to substantially completely convert said first mentioned resin to porous carbon.

4. The process as defined in claim 1, said impregnating said fibrous reinforcement material with said first mentioned resin and said reimpregnating said pyrolyzed composite being carried out at elevated temperature and under pressure conditions to ensure thorough impregnation of said fibrous reinforcement material and said pyrolyzed composite, respectively, substantially without affecting said fibrous reinforcement material, and said pyrolyzing being carried out in an atmosphere of nitrogen or argon to substantially completely convert said resin to porous carbon, said pyrolysis being carried out at temperature ranging from about 1,000° F. to about 2,500° F.

5. The process as defined in claim 1, said first mentioned resin and said additional resin selected from the group consisting of phenolic, coal tar pitch, polyphenylene, heterocyclic resins, epoxy, silicone, melamine, alkyd, polyester and polyamide resins.

6. The process as defined in claim 5, said fibrous reinforcement material comprised of fibers of a substance selected from the group consisting of carbon, graphite, glass, silica, quartz, asbestos and boron.

7. The process as defined in claim 4, said first mentioned resin and said additional resin selected from the group consisting of phenolic, coal tar pitch, polyphenylene, heterocyclic resins, epoxy, silicone, melamine, alkyd, polyester and polyimide resins, said fibrous reinforcement material comprised of fibers of a substance selected from the group consisting of carbon, graphite, glass, silica, quartz, asbestos and boron.

8. The process as defined in claim 1, said first mentioned resin and said additional resin being a phenolic resin, and said fibrous reinforcement material comprised of fibers of graphite or carbon.

9. The process as defined in claim 7, said first mentioned resin and said additional resin being a phenolic resin, and said fibrous reinforcement material comprised of fibers of graphite or carbon.

10. The process as defined in claim 6, said fibrous reinforcement material being a three-dimensional woven fabric comprised of said fibers.

11. The process as defined in claim 9, said fibrous reinforcement material being a three-dimensional woven fabric comprised of said fibers.

12. The process as defined in claim 7, said impregnating said fibrous reinforcement material with said first mentioned resin and said impregnating said pyrolyzed composite being carried out at elevated temperature and under alternate vacuum and pressure to ensure thorough impregnation of said fibrous reinforcement material and said pyrolyzed composite, respectively, and to gelation of said first mentioned resin and of said additional resin, respectively, and prior to said curing said first mentioned resin and said additional resin, respectively.

13. The process as defined in claim 11, said impregnating said fibrous reinforcement material with said first mentioned resin and said reimpregnating said pyrolyzed composite being carried out at elevated temperature and under alternative vacuum and pressure to ensure thorough impregnation of said fibrous reinforcement material and said pyrolyzed composite, respectively, and to gelation of said first mentioned resin and of said additional resin, respectively.

14. The process as defined in claim 12, said pyrolysis temperature ranging from about 1,300° F. to about 1,900° F.

15. The process as defined in claim 13, said pyrolysis temperature ranging from about 1,800° F. to about 1,900° F.

16. The process for producing a plastic composite having improved elevated temperature strength and good heat resistance, which consists essentially of impregnating fibrous reinforcement material comprised of fibers of graphite or carbon, with a concentrated solvent solution of a phenolic resin, at elevated temperature and under vacuum to boil away said solvent and then under pressure to ensure thorough penetration of said fibrous reinforcement material by said resin, to gelation of said resin, curing said resin at temperature ranging from about 275° F. to about 450° F., and forming an initial fiber-resin composite, pyrolyzing said fiber-resin composite at temperature ranging from about 1,300° F. to about 1,900° F. in an inert atmosphere, and substantially completely converting said resin of said fiber-resin composite to porous carbon, reimpregnating the resulting pyrolyzed porous fibrous reinforcement-carbon composite with additional liquid phenolic resin, at elevated temperature and under vacuum and then under pressure to ensure thorough penetration of said pyrolyzed porous completely by said additional resin, to gelation of said additional resin, and curing said additional resin at temperature ranging from about 275° F. to about 450° F., forming a bimatrix fibrous reinforcement-carbon-resin composite comprised of a mixture of carbon and resin matrices, and fibrous reinforcement, said carbon of said bimatrix fibrous reinforcement-carbon-resin composite being mechanically locked and adhered to said fibrous reinforcement.

17. The process as defined in claim 16, said fibrous reinforcement being a three-dimensional woven fabric comprised of said fibers.

18. The process as defined in claim 17, said pyrolysis temperature ranging from about 1,300° F. to about 1,900° F.

19. The process as defined in claim 16, said pyrolysis carried out in a nitrogen atmosphere.

20. The process as defined in claim 16, said initial fiber-resin composite containing about 35 to about 45% of said fibers and about 55 to about 65% of said resin, by weight, said pyrolyzed porous fibrous reinforcement-carbon composite having about 20 to about 40% porosity, and said resin reimpregnated pyrolyzed fibrous reinforcement-carbon composite forming a bimatrix composite of a mixture of carbon and resin matrix phases reinforced with said fibers, said last mentioned fibrous reinforcement-carbon-resin composite comprising about 35 to about 60% fibers, about 20 to about 45% carbon and about 20 to about 45% resin, by weight.

21. The process as defined in claim 20, said fibrous reinforcement material being a three-dimensional woven fabric comprised of said fibers, said pyrolysis carried out in a nitrogen atmosphere.

22. The process as defined in claim 21, said initial resin being an isopropanol solution of a phenolformaldehyde resin, said impregnating resin being a modified phenol-formaldehyde resin containing an aromatic amine, said first mentioned resin and said additional resin being heated to about 150° F. during said impregnation of said fibrous reinforcement material and said reimpregnation of said pyrolyzed porous fibrous reinforcement-carbon composite, said curing of said resin of said initial fibrous reinforcement-resin composite and of said additional resin of said reimpregnated fibrous reinforcement-carbon-resin composite being carried out at about 350° F., and aid pyrolysis temperature ranging from about 1,300° F. to about 1,900° F.

* * * * *